Nov. 9, 1937.  R. CHILTON  2,098,566
DE-ICING MEANS FOR AIRCRAFT
Filed Oct. 27, 1934
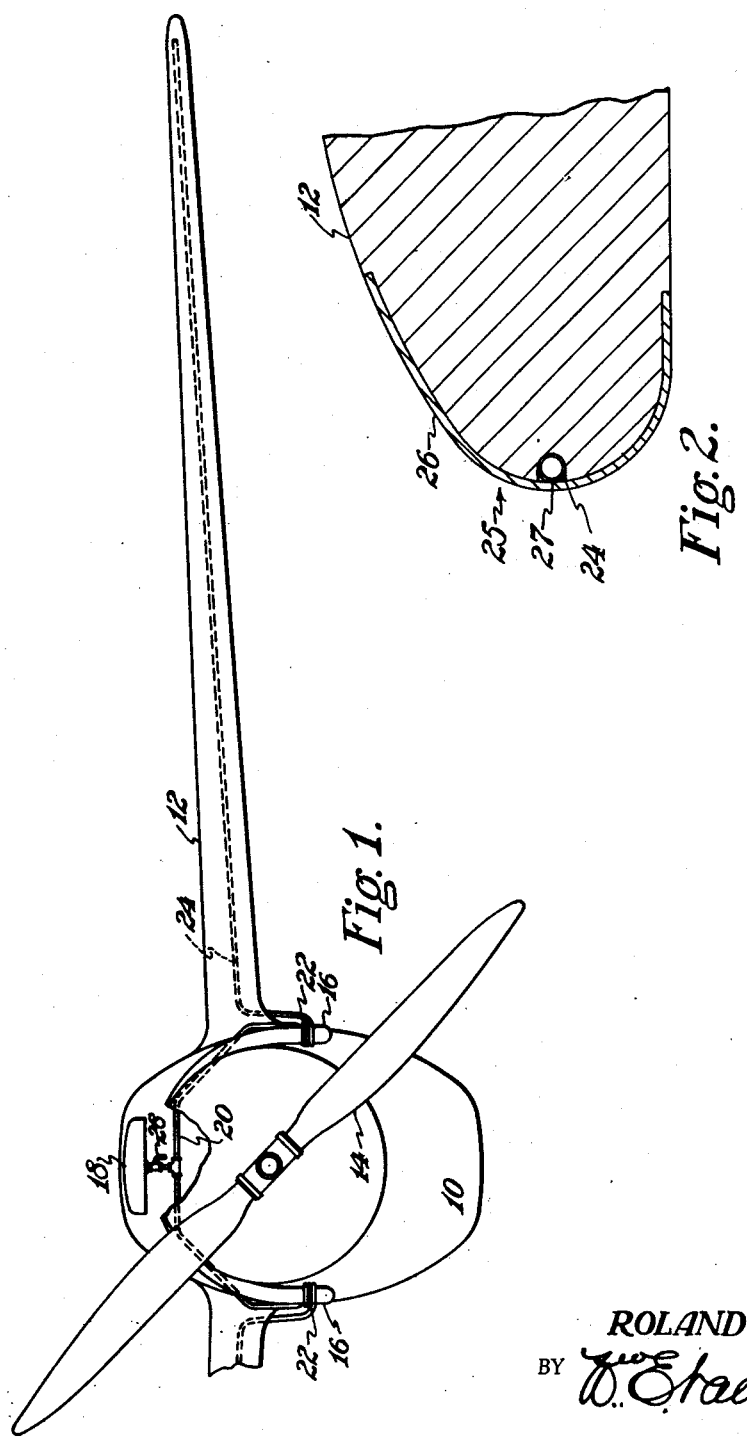
INVENTOR.
ROLAND CHILTON
BY
ATTORNEY.

Patented Nov. 9, 1937

2,098,566

UNITED STATES PATENT OFFICE 2,098,566

DE-ICING MEANS FOR AIRCRAFT

Roland Chilton, Ridgewood, N. J., assignor, by mesne assignments, to The Reed Propeller Co., Inc., Garden City, N. Y., a corporation of New York Application October 27, 1934, Serial No. 750,253

2 Claims. (Cl. 244—134)

This invention relates to improved and simplified means for preventing the accumulation of ice on aircraft wings and other parts and for the removal of ice already formed.

In the co-pending application, Serial No. 739,808, filed August 14, 1934, there have been described experiments in connection with ice prevention in carburetors, wherein it was found that an alcohol spray was effective, not only in preventing ice formation but in removing accumulations already formed.

The present invention proposes to extend the use of this discovery by providing suitable and novel means for the conduction of alcohol or other non-freezing ice solvent to the wings and for spreading de-icing fluid uniformly in controlled small quantities over the areas to be protected.

In the drawing:

Fig. 1 is a fragmentary diagram representing an airplane front view; and

Fig. 2 is a fragmentary section through the leading edge of a wing.

In the drawing, 10 represents a fuselage of an airplane having a wing 12 and an engine with the usual propeller 14 and exhaust manifold 16. A gravity tank 18, to contain alcohol, or other non-freezing ice solvent, is connected by suitable pipes 20 to coils 22 surrounding the exhaust manifold and from these coils, pipes such as 24 are laid along the leading edge of the wing and other parts subject to ice formation.

Each area to be served, such as the leading edge 26 of the wing 12, is covered with a sheet of porous material as indicated at 26 and the pipe is perforated with a large number of holes of small diameter, as at 27, compared to the diameter of the pipe. A suitable control valve 28 is incorporated in the tank connection and connected to a suitable pilot's control (not shown).

The operation of the device is as follows: When the pilot meets with icing conditions he opens the valve 28 whereby de-icing fluid reaches the evaporating coils 22 by gravity and is then converted into vapor which issues from the perforations in the pipe 24 and condenses to saturate the porous covering 26, through which it is distributed and which holds the fluid against loss in the form of drops.

Experiments with porous materials wetted with alcohol have shown:

(a) That the formation of ice on such surfaces is prevented or greatly delayed and that the adhesion of any ice that forms is reduced to the point where vibration and slipstream effects remove it before any substantial thickness accumulates, and (b) If the alcohol be used after a substantial accumulation has collected, the solvent action, when the porous surface is saturated, quickly destroys the adhesion so that the ice is blown or vibrated away in small lumps.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. The combination with an aircraft having an engine exhaust pipe and a surface to be de-iced, of an alcohol reservoir, an evaporator attached to said pipe, porous covering over said surface, and means to conduct alcohol from said evaporator to saturate said covering.

2. In aircraft having a wing, a reservoir for an ice solvent fluid in said aircraft, a duct having perforations extending from said reservoir along the leading edge of said wing, a fluid absorbent overshoe enveloping said duct and the leading edge of said wing, and a heater associated with said duct for warming said fluid in its flow therethrough.

ROLAND CHILTON.